US012036697B2

(12) United States Patent
Nakamura et al.

(10) Patent No.: US 12,036,697 B2
(45) Date of Patent: Jul. 16, 2024

(54) METHOD AND DEVICE FOR PRODUCING CERAMIC FORMED BODY

(71) Applicant: NGK INSULATORS, LTD., Nagoya (JP)

(72) Inventors: Hirotada Nakamura, Nagoya (JP); Takuya Yamada, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 513 days.

(21) Appl. No.: 16/738,058

(22) Filed: Jan. 9, 2020

(65) Prior Publication Data

US 2020/0238567 A1 Jul. 30, 2020

(30) Foreign Application Priority Data

Jan. 24, 2019 (JP) ................................ 2019-010607

(51) Int. Cl.

*B28B 3/20* (2006.01)
*B28B 3/26* (2006.01)
*B28B 13/02* (2006.01)

(52) U.S. Cl.

CPC ................ *B28B 3/20* (2013.01); *B28B 3/269* (2013.01); *B28B 13/0215* (2013.01); *B28B 13/0275* (2013.01); *B28B 2003/203* (2013.01)

(58) Field of Classification Search

CPC .. B28B 3/20; B28B 3/22; B28B 3/222; B28B 3/224; B28B 3/226; B28B 3/269; B28B 2003/203; B28B 13/0215; B28B 13/0265; B28B 13/027; B28B 13/0275; B28B 17/0081; B28C 1/04; B28C 7/024; B28C 7/0445

See application file for complete search history.

(56) References Cited

U.S. PATENT DOCUMENTS 3,746,315 A 7/1973 Rizzi et al.
3,746,489 A 7/1973 Rizzi et al.

(Continued)

FOREIGN PATENT DOCUMENTS

DE 2 165 148 A1 7/1972
DE 102 47 030 A1 5/2003

(Continued)

OTHER PUBLICATIONS

German Office Action (with English translation) dated Apr. 14, 2023 (Application No. 10 2020 000 165.3).

*Primary Examiner* — Xiao S Zhao
*Assistant Examiner* — Joseph S Leyson
(74) *Attorney, Agent, or Firm* — BURR PATENT LAW, PLLC

(57) ABSTRACT

A method for producing a ceramic formed body comprises: a wet mixing step of adding a liquid containing water to ceramic raw material mixed powder and subjecting it to wet mixing in a continuous mixer; and an extrusion molding step of feeding the wet mixed powder obtained in the wet mixing step to an extruder by a belt feeder and extruding the wet mixed powder. In the method for producing the ceramic formed body, an amount of the wet mixed powder fed to the extruder is adjusted based on an amount of mass change of the wet mixed powder stored in a reservoir provided between the continuous mixer and the belt feeder.

5 Claims, 5 Drawing Sheets

(56) References Cited

U.S. PATENT DOCUMENTS

| | | | | |
|---|---|---|---|---|
| 3,797,761 | A * | 3/1974 | Neil | B29C 48/2888<br>241/101.8 |
| 5,184,754 | A * | 2/1993 | Hansen | G01G 13/026<br>222/413 |
| 2003/0098530 | A1 | 5/2003 | Inoguchi | |
| 2010/0102491 | A1 | 4/2010 | Inoguchi | |
| 2011/0006461 | A1* | 1/2011 | Dasher | G01N 21/359<br>264/408 |
| 2012/0133065 | A1 | 5/2012 | Caffrey et al. | |
| 2016/0288366 | A1 | 10/2016 | Tajima et al. | |
| 2016/0288367 | A1 | 10/2016 | Tajima et al. | |
| 2018/0273433 | A1* | 9/2018 | Nakajo | C04B 35/195 |

FOREIGN PATENT DOCUMENTS

| | | | |
|---|---|---|---|
| JP | H04-301003 | A | 10/1992 |
| JP | 2001-225319 | A | 8/2001 |
| JP | 2004-123876 | A | 4/2004 |
| JP | 2008-137173 | A1 | 6/2008 |
| JP | 2016-193589 | A1 | 11/2016 |
| JP | 2016-193590 | A1 | 11/2016 |
| JP | 2017-094736 | A | 6/2017 |

* cited by examiner

METHOD AND DEVICE FOR PRODUCING CERAMIC FORMED BODY

FIELD OF THE INVENTION

The present invention relates to a method and device for producing a ceramic formed body.

BACKGROUND OF THE INVENTION

Ceramic formed bodies are generally used for various products or parts. For example, a honeycomb-shaped ceramic formed body having a lattice-shaped partition walls that define a plurality of cells serving as fluid flow paths extending from one end surface to other end surface is used for a wide variety of applications such as catalyst supports for motor vehicle exhaust gas purification, diesel particulate removal filters, gasoline particulate removal filters and heat storage bodies for combustion devices.

The honeycomb formed body is produced by subjecting a ceramic raw material mixed powder to a wet mixing process with a liquid containing water to obtain a wet mixed powder, and then kneading the wet mixed powder and extruding it into a desired shape (e.g., Patent Documents 1 to 3). The extrusion molding is carried out by extruding the kneaded product (a green body) at a certain extrusion pressure and extrusion rate using an extruder having a desirable-shaped extrusion die (cap) attached to an extrusion port, while matching an extrusion direction to the horizontal direction.

CITATION LIST

Patent Literatures

Patent Document 1: Japanese Patent Application Publication No. 2008-137173 A
Patent Document 2: Japanese Patent Application Publication No. 2016-193589 A
Patent Document 3: Japanese Patent Application Publication No. 2016-193590 A

SUMMARY OF THE INVENTION

The present invention relates to a method for producing a ceramic formed body, the method comprising:
- a wet mixing step of adding a liquid containing water to ceramic raw material mixed powder and subjecting it to wet mixing in a continuous mixer; and
- an extrusion molding step of feeding the wet mixed powder obtained in the wet mixing step to an extruder by a belt feeder and extruding the wet mixed powder,
- wherein an amount of the wet mixed powder fed to the extruder is adjusted based on an amount of mass change of the wet mixed powder stored in a reservoir provided between the continuous mixer and the belt feeder.

Further, the present invention relates to a device for producing a ceramic formed body, comprising:
- a continuous mixer for adding a liquid containing water to ceramic raw material mixed powder and wet-mixing it;
- a belt feeder for feeding wet mixed powder obtained by the continuous mixer to an extruder;
- an extruder for extruding the wet mixed powder fed from the belt feeder;
- a reservoir for temporarily storing the wet mixed powder, the reservoir being provided between the continuous mixer and the belt feeder; and
- a control unit for adjusting an amount of the wet mixed powder fed to the extruder based on an amount of mass change of the wet mixed powder stored in the reservoir.

According to the present invention, it is possible to provide a method and a device for producing a ceramic formed body, which can continuously and stably produce a ceramic formed body with high dimensional accuracy.

DETAILED DESCRIPTION OF THE INVENTION

Figure 1:
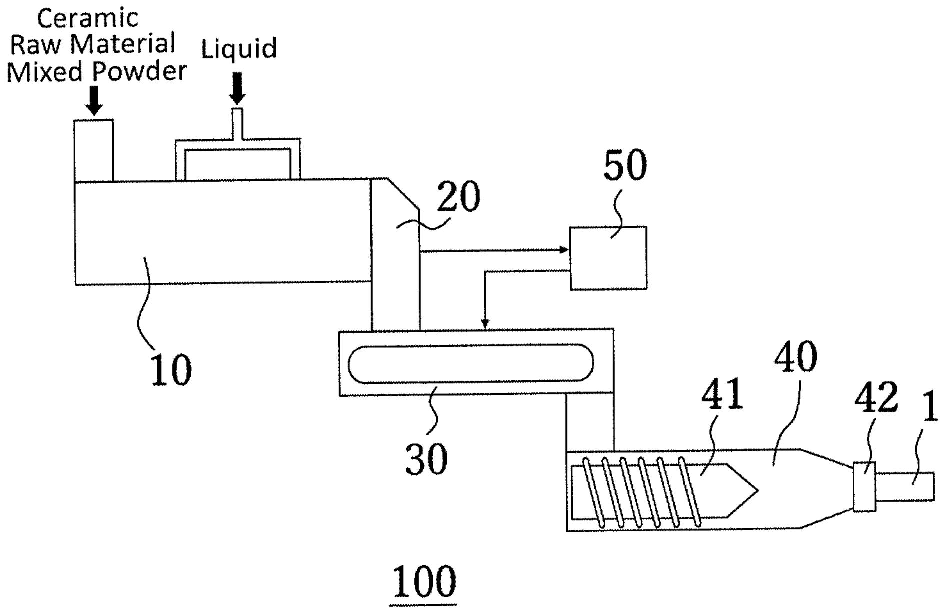
FIG. 1 is an entire structural view of a production device for a ceramic formed body according to an embodiment of the present invention.

In recent years, steps from wet mixing to extrusion molding have been continuously carried out by performing wet mixing in a continuous mixer, in terms of increasing a production efficiency of a ceramic formed body.

However, an amount of the wet mixed powder discharged from the continuous mixer may vary due to an influence of dust collection or the like which is performed in the continuous mixer. A decreased amount of wet mixed powder discharged from the continuous mixer leads to a decreased amount of wet mixed powder fed to the extruder, and an increased amount of wet mixed powder discharged from the continuous mixer leads to retention of the wet mixed powder between the continuous mixer and the extruder. Therefore, under such circumstances, the amount of wet mixed powder fed to the extruder may vary, so that dimensional accuracy of the honeycomb formed body may be deteriorated. In some cases, a production device for the honeycomb formed body has to be temporarily stopped.

On the other hand, in order to stabilize the amount of the wet mixed powder discharged from the continuous mixer, a method for adjusting the amount of the ceramic raw material mixed powder or liquid added to the continuous mixer can be considered.

However, in this method, a moisture content of the wet mixed powder obtained by the continuous mixer varies before and after the adjustment, so that the dimensional accuracy of the ceramic formed body is deteriorated.

The present invention has been made to solve the above problems. An object of the present invention is to provide a method and a device for producing a ceramic formed body, which can continuously and stably produce a ceramic formed body with high dimensional accuracy.

As a result of intensive studies to solve the above problems, the present inventors have found that a reservoir for temporarily storing wet mixed powder is provided between a continuous mixer and a belt feeder, and an amount of wet mixed powder fed to an extruder is adjusted based on an amount of mass change of the wet mixed powder stored in that reservoir, whereby a ceramic formed body having higher dimensional accuracy can be continuously and stably produced without changing a moisture content of the wet mixed powder, and they have completed the present invention.

Hereinafter, embodiments according to the present invention will be specifically described with reference to the drawings. It is to understand that the present invention is not limited to the following embodiments, and various modifications and improvements, which will be within the scope of the present invention, may be made based on ordinary knowledge of a person skilled in the art, without departing from the spirit of the present invention.

A method for producing a ceramic formed body according to one embodiment of the present invention includes: a wet mixing step of adding a liquid containing water to ceramic raw material mixed powder and subjecting it to wet mixing in a continuous mixer; and an extrusion molding step of feeding the wet mixed powder obtained in the wet mixing step to an extruder by a belt feeder and extruding the wet mixed powder, wherein an amount of the wet mixed powder fed to the extruder is adjusted based on an amount of mass change of the wet mixed powder stored in a reservoir provided between the continuous mixer and the belt feeder.

The method for producing the ceramic formed body can be carried out using a ceramic formed body production device 100 as shown in FIG. 1. The ceramic formed body production device 100 includes: a continuous mixer 10; a reservoir 20; a belt feeder 30; an extruder 40; and a control unit 50. Hereinafter, the production method for the ceramic formed body 1 according to the present embodiment will be described together with the configuration of the ceramic formed body production device 100.

The wet mixing step is carried out using the continuous mixer 10. To the continuous mixer 10 is gradually added ceramic raw material mixed powder at a predetermined addition rate, and at the same time added a liquid defined according to an amount of the ceramic raw material mixed powder added. The added ceramic raw material mixed powder and liquid are uniformly wet-mixed by a stirring mechanism (not shown) to produce wet mixed powder. By carrying out the wet mixing step using the continuous mixer 10, the steps from the wet mixing step to the extrusion molding step can be continuously carried out, so that a production efficiency of a ceramic formed body 1 can be increased.

The continuous mixer 10 is not particularly limited as long as it can allow wet mixing, and a commercially available continuous mixer may be used.

Here, the ceramic raw material mixed powder added to the continuous mixer 10 is not particularly limited, but typically, it is ceramic raw material dry mixed powder obtained by dry-mixing in a batch type mixer.

The type of ceramic raw material mixed powder is not particularly limited, but ceramic raw material mixed powder known in the art may be used. For example, mixed powder of aggregate particle raw materials that will be structural components of the ceramic formed body 1 can be used. Examples of the aggregate particle raw material include cordierite forming raw material, mullite, alumina, aluminum titanate, lithium aluminum silicate, silicon carbide, silicon nitride, metal silicon, or a mixture thereof. As used herein, the cordierite forming raw material means a material that is converted to cordierite by firing, including, for example, a material obtained by mixing talc, kaolin, alumina, aluminum hydroxide, silica, and the like such that a composition after firing is a theoretical composition of cordierite ($2MgO-2Al_2O_3-5SiO_2$), and the like.

The liquid added to the continuous mixer 10 contains water in order to convert the ceramic raw material mixed powder to wet mixed powder. Optionally, the liquid may further contain one or more selected from surfactants, lubricants and plasticizers, in order to obtain a forming raw material having a viscosity suitable for extrusion molding.

The wet mixed powder obtained in the wet mixing step is discharged from the continuous mixer 10 and temporarily stored in the reservoir 20. The reservoir 20 is provided between the continuous mixer 10 and the belt feeder 30, and stably feeds a predetermined amount of wet mixed powder to the extruder 40 via the belt feeder 30. By providing the reservoir 20, the amount of the wet mixed powder fed to the extruer 40 can be stabilized, and the ceramic formed body 1 can be continuously produced without temporarily stopping the ceramic formed body production device 100.

The reservoir 20 can have a non-limiting shape and the like, as long as it has a function of temporarily storing the wet mixed powder discharged from the continuous mixer 10.

The belt feeder 30 feeds the wet mixed powder obtained by the continuous mixer 10 to the extruder 40. That is, the belt feeder 30 is provided between the reservoir 20 and the extruder 40, and feeds the wet mixed powder discharged from the continuous mixer 10 and temporarily stored in the reservoir 20 to the extruder 40.

The belt feeder 30 is not particularly limited as long as the wet mixed powder can be fed to the extruder 40. A commercially available product can be used.

The extrusion molding step is carrying out using the extruder 40. The extruder 40 has an extrusion screw 41 and an extrusion die 42 (cap), and allows the wet mixed powder fed from the belt feeder 30 to move forward while kneading the wet mixed powder by the extrusion screw 41, and finally extrudes the wet mixed powder from the extrusion die 42 to produce the ceramic formed body 1.

The extrusion molding may be carried out by extruding the wet mixed powder into a desired shape depending on applications where the ceramic formed body 1 will be used. For example, in order to obtain a honeycomb-shaped ceramic formed body 1 used in a catalyst support for motor vehicle exhaust gas purification, a diesel particulate removal filter, a gasoline particulate removal filter, a heat storage body for a combustion device, or the like, the wet mixed powder may be extruded into a honeycomb shape.

The extruder 40 is not particularly limited as long as it has the above function. A commercially available product can be used.

Figure 2:
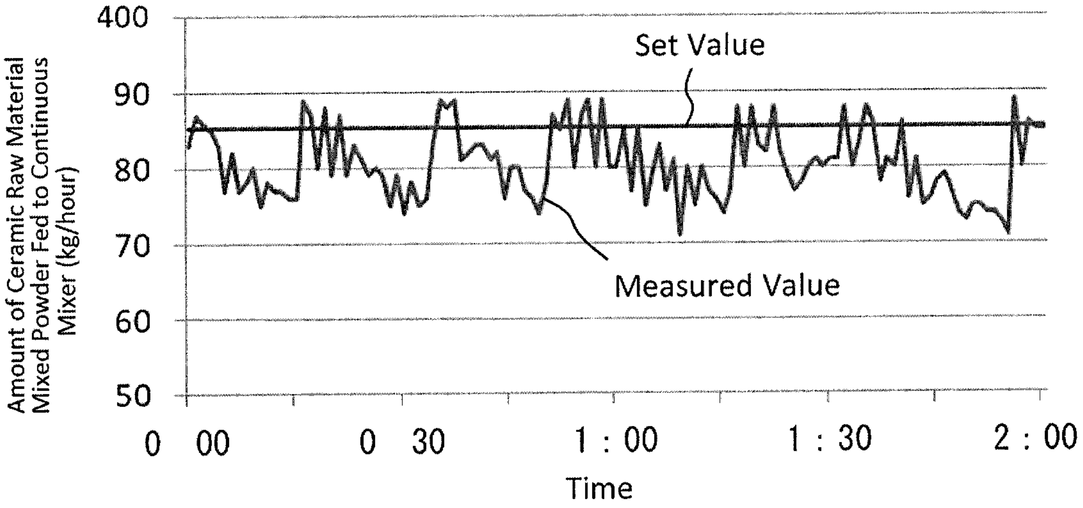
FIG. 2 is a graph showing an amount of ceramic raw material mixed powder fed to a continuous mixer, where an amount of ceramic raw material mixed powder fed to a continuous mixer is adjusted based on an amount of mass change of wet mixed powder stored in a reservoir.

The continuous production of the ceramic formed body 1 using the production method including the wet mixing step and the extrusion step while adjusting the amount of the ceramic raw material mixed powder fed to the continuous mixer 10 based on an amount of mass change of the wet mixed powder stored in the reservoir 20 results in an increased variation in a measured value relative to a set value (a target value) of the amount of the ceramic raw material mixed powder fed to the continuous mixer 10, as shown in FIG. 2. Here, FIG. 2 shows results when a circular pillar shaped honeycomb ceramic formed body having a diameter of 126.5 mm and a length of 67.0 mm is produced.

Therefore, the amount of the wet mixed powder fed to the extruder 40 is adjusted based on the amount of mass change of the wet mixed powder stored in the reservoir 20. The adjustment is carried out by the control unit 50.

The control unit 50 is electrically connected to a means for measuring a mass change of the wet mixed powder stored in the reservoir 20 and to the belt feeder 30. The means for measuring the amount of mass change of the wet mixed powder stored in the reservoir 20 includes, but not particularly limited to, a load cell and the like. The control unit 50 determines an adjustment amount of the wet mixed powder to be fed to the extruder 40 based on information from the means for measuring the amount of mass change of the wet mixed powder stored in the reservoir 20, and transmits the information to the belt feeder 30. The control unit 50 adjusts the amount of the wet mixed powder fed to the extruder 40 by controlling a speed of the belt feeder 30.

It is preferable that the amount of mass change of the wet mixed powder stored in the reservoir 20 is equal to the adjustment amount of the wet mixed powder fed to the extruder 40. For example, when the mass of the wet mixed powder stored in the reservoir 20 is increased by 5 kg per hour, the adjustment amount of the wet mixed powder fed to the extruder 40 may be increased by 5 kg per hour.

Figure 3:
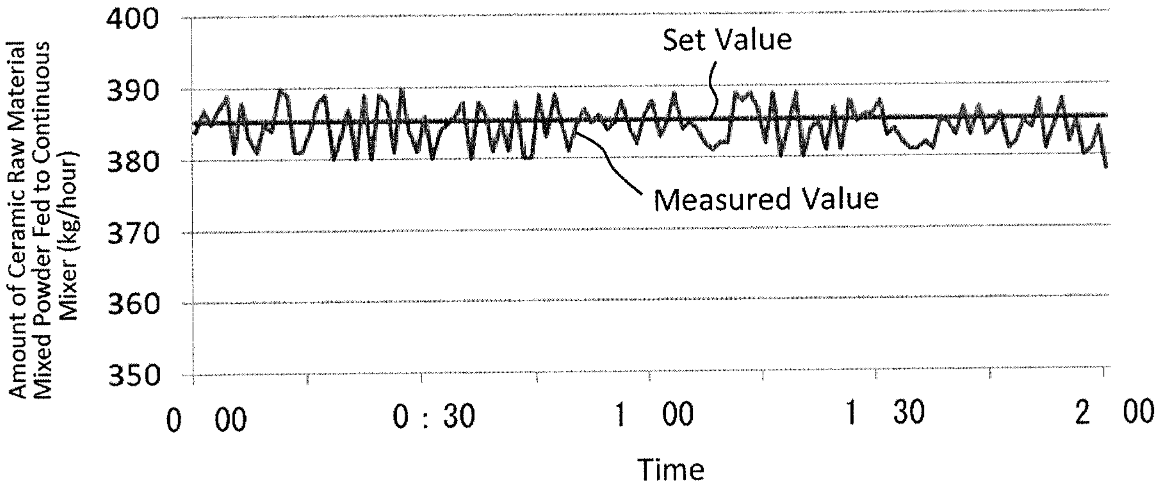
FIG. 3 is a graph showing an amount of ceramic raw material mixed powder fed to a continuous mixer, where an amount of wet mixed powder fed to an extruder is adjusted based on an amount of mass change of a wet mixed powder stored in a reservoir.

FIG. 3 shows results after adjusting the amount of the wet mixed powder fed to the extruder 40 using the above method. It should be noted that FIG. 3 shows the results when a honeycomb ceramic formed body equivalent to that shown in FIG. 2 is produced (under the same conditions with the exception that the amount of the wet mixed powder fed to the extruder 40 is adjusted). In this example, the adjustment amount of the wet mixed powder fed to the extruder 40 was equal to the amount of mass change (which was increased by 5 kg per hour) of the wet mixed powder stored in the reservoir 20. As shown in FIG. 3, the variation in the measured value relative to the set value (target value) of the amount of the ceramic raw material mixed powder fed to the continuous mixer 10 was decreased by adjusting the amount of the wet mixed powder fed to the extruder 40 using the above method.

Figure 4:
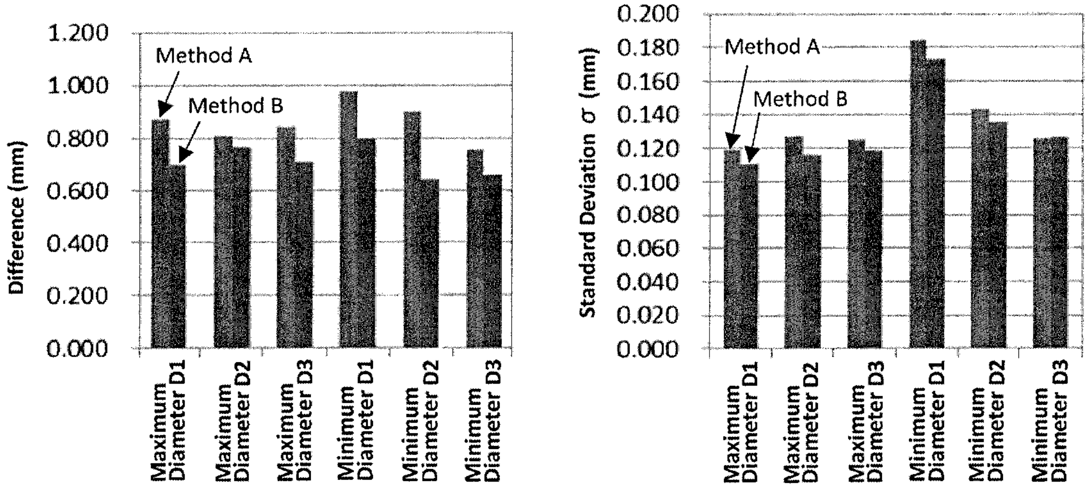
FIG. 4 is results showing a difference between diameters of a honeycomb ceramic formed body in both a case where an amount of ceramic raw material mixed powder fed to a continuous mixer is adjusted and a case where an amount of wet mixed powder fed to an extruder is adjusted, based on an amount of mass change of wet mixed powder stored in a reservoir.
Figure 5:
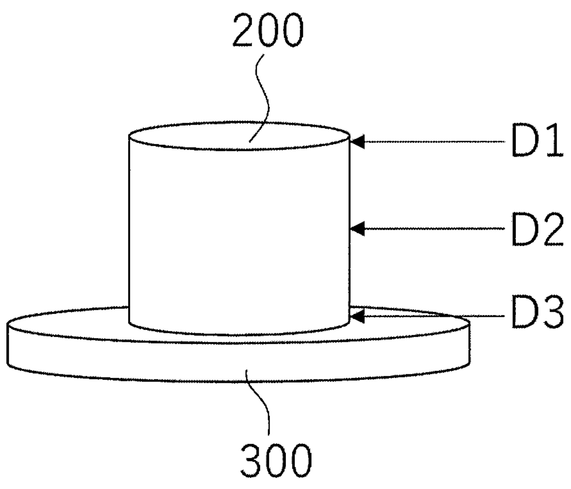
FIG. 5 is a view for explaining a method of measuring a diameter of a honeycomb ceramic formed body.

FIG. 4 is results showing a difference between diameters of the honeycomb ceramic formed body in both a case where the amount of ceramic raw material mixed powder fed to the continuous mixer 10 is adjusted (Method A) and a case where the amount of wet mixed powder fed to the extruder 40 is adjusted (Method B), based on the amount of mass change of wet mixed powder stored in the reservoir 20. The production conditions are the same as described above. The diameter of the honeycomb ceramic formed body was measured using a laser type external dimension measuring device (which may be referred to as a "laser displacement meter"). In the measurement, as shown in FIG. 5, a honeycomb ceramic formed body 200 was placed on a rotary table 300, and an outer peripheral surface of the honeycomb ceramic formed body 200 was irradiated with a laser from a light source unit of the laser type external dimension measuring device. The laser reflected by the outer peripheral surface of the honeycomb ceramic formed body 200 was detected by a light receiving element of the laser type external dimension measuring device, and dimension measurement was carried out based on the principle of triangulation. Further, the dimension measurement was carried out at three positions D1 to D3 in the axial length of the honeycomb ceramic formed body 200. D1 is a position of 6 mm from the upper surface of the honeycomb ceramic formed body 200, D2 is a central position of the honeycomb ceramic formed body 200 in the axial length, and D3 is a position of 6 mm from the lower surface of the honeycomb ceramic formed body 200.

As shown in FIG. 4, the method B resulted in a smaller difference between the maximum diameter and the minimum diameter, as compared with the method A, and resulted in a standard deviation equal to or less than that of the method A. Therefore, the dimensional accuracy of the honeycomb ceramic formed body was improved by adjusting the amount of the wet mixed powder fed to the extruder 40 based on the amount of mass change of the wet mixed powder stored in the reservoir 20.

By adjusting the amount of the wet mixed powder fed to the extruder 40 based on the amount of mass change of the wet mixed powder stored in the reservoir 20 as described above, a fixed amount of the wet mixed powder can be fed to the extruder 40, so that a pressure in the extruder 40 is difficult to vary and the dimensional accuracy of the ceramic formed body 1 can be increased. Moreover, a balance between the amount of the wet mixed powder discharged from the continuous mixer 10 and the amount of the wet mixed powder fed to the extruder 40 can be maintained within an appropriate range, so that the ceramic formed body production device 100 can be easily managed, and the ceramic formed body 1 can be continuously and stably produced.

INDUSTRIAL APPLICABILITY

The method and device for producing the ceramic formed body according to the present invention can be used for producing a ceramic formed body that is available for catalyst supports for motor vehicle exhaust gas purification, diesel particulate removal filters, gasoline particulate removal filters, or heat storage bodies for combustion devices.

DESCRIPTION OF REFERENCE NUMERALS

1 ceramic formed body
10 continuous mixer
20 reservoir
30 belt feeder
40 extruder
41 extrusion screw
42 extrusion die
50 control unit
100 ceramic formed body production device
200 honeycomb ceramic formed body
300 rotary table

What is claimed is:

1. A method for producing a ceramic formed body, the method comprising:
- a wet mixing step of adding a liquid containing water to ceramic raw material mixed powder and subjecting it to wet mixing in a continuous mixer; and
- an extrusion molding step of feeding the wet mixed powder obtained in the wet mixing step to an extruder by a belt feeder and extruding the wet mixed powder,
- where an amount of mass change per predetermined time of the wet moved powder stored in a reservoir provided between the continuous mixer and the belt feeder is measured;
- wherein an amount per predetermined time of the wet mixed powder fed to the extruder is adjusted by controlling a speed of the belt feeder based on the measured amount of mass change per predetermined time of the wet mixed powder stored in the reservoir; and wherein the measured amount of mass change per predetermined time of the wet mixed powder stored in the reservoir is equal to the adjusted amount per predetermined time of the wet mixed powder fed to the extruder.

2. The method for producing the ceramic formed body according to claim 1, wherein the wet mixed powder is extruded into a honeycomb shape.

3. The method for producing the ceramic formed body according to claim 1, wherein the ceramic raw material mixed powder is ceramic raw material dry mixed powder obtained by dry-mixing in a batch mixer.

4. The method for producing the ceramic formed body according to claim 1, wherein the liquid further contains one or more selected from surfactants, lubricants and plasticizers.

5. A device for producing a ceramic formed body, comprising:

a continuous mixer for adding a liquid containing water to ceramic raw material mixed powder and wet-mixing it;

a belt feeder for feeding wet mixed powder obtained by the continuous mixer to an extruder;

the extruder for extruding the wet mixed powder fed from the belt feeder;

a reservoir for temporarily storing the wet mixed powder, the reservoir being provided between the continuous mixer and the belt feeder; and a control unit determining an adjusted amount per predetermined time of the wet mixed powder fed to the extruder based on an amount of mass change per predetermined time of the wet mixed powder stored in the reservoir;

wherein the control unit is configured to adjust the amount per predetermined time of the wet mixed powder fed to the extruder by controlling a speed of the belt feeder such that the amount of mass change per predetermined time of the wet mixed powder stored in the reservoir is equal to the adjusted amount per predetermined time of the wet mixed powder fed to the extruder.

* * * * *